US012581080B2

(12) United States Patent
Racape et al.

(10) Patent No.: US 12,581,080 B2
(45) Date of Patent: Mar. 17, 2026

(54) SYSTEM AND METHOD FOR COMPRESSION OF DATA STREAM

(71) Applicant: InterDigital Madison Patent Holdings, SAS, Paris (FR)

(72) Inventors: Fabien Racape, Los Altos, CA (US); Swayambhoo Jain, Los Altos, CA (US); Shahab Hamidi-Rad, Los Altos, CA (US); Jean Begaint, Los Altos, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 84 days.

(21) Appl. No.: 17/786,126

(22) PCT Filed: Dec. 18, 2020

(86) PCT No.: PCT/US2020/065974
§ 371 (c)(1),
(2) Date: Jun. 16, 2022

(87) PCT Pub. No.: WO2021/127408
PCT Pub. Date: Jun. 24, 2021

(65) Prior Publication Data
US 2023/0014367 A1     Jan. 19, 2023

Related U.S. Application Data

(60) Provisional application No. 62/951,103, filed on Dec. 20, 2019.

(51) Int. Cl.
| | |
|---|---|
| *H04N 19/13* | (2014.01) |
| *H04N 19/184* | (2014.01) |
| *H04N 19/70* | (2014.01) |

(52) U.S. Cl.
CPC .......... *H04N 19/13* (2014.11); *H04N 19/184* (2014.11); *H04N 19/70* (2014.11)

(58) Field of Classification Search
CPC ....... H04N 19/13; H04N 19/184; H04N 19/70
(Continued)

(56) References Cited

U.S. PATENT DOCUMENTS

| | | | |
|---|---|---|---|
| 2012/0057799 A1 | 3/2012 | Nguyen et al. | |
| 2012/0257799 A1 | 10/2012 | Yano et al. | |

(Continued)

FOREIGN PATENT DOCUMENTS

| | | |
|---|---|---|
| CN | 109961392 A | 7/2019 |
| WO | WO 2019/008661 A1 | 1/2019 |

OTHER PUBLICATIONS

Working Draft 2 of Compression of Neural Networks for Multimedia Content Description and Analysis, 128. MPEG Meeting (Motion Picture Expert Group or 1S0/IEC JTC1/SC29/WG11), Oct. 7, 2019-Oct. 11, 2019, Geneva. (Year: 2019).*

(Continued)

*Primary Examiner* — Edemio Navas, Jr.
(74) *Attorney, Agent, or Firm* — Flaster Greenberg P.C.

(57) ABSTRACT

Procedures, methods, architectures, apparatuses, systems, devices, and computer program products, according to a first aspect, for compressing data including encoding at least one information representative of a use, during the compression, of a compressed sparse format.

Procedures, methods, architectures, apparatuses, systems, devices, and computer program products, according to a second aspect, for decompressing input data comprising obtaining information representative of zero or non-zero values in at least a part of the input data, and using only the (Continued)

non-zero values of the zero or non-zero values for a further processing of the part of the input data, based on the representative information.

18 Claims, 8 Drawing Sheets

(58) Field of Classification Search
USPC ...................................................... 375/240.02
See application file for complete search history.

(56)                                    References Cited

U.S. PATENT DOCUMENTS

| | | | | |
|---|---|---|---|---|
| 2012/0263238 A1* | 10/2012 | Miyoshi | ............... | H04N 19/137 |
| | | | | 375/E7.243 |
| 2013/0272414 A1* | 10/2013 | Sole Rojals | ........... | H04N 19/14 |
| | | | | 375/240.16 |
| 2014/0023137 A1 | 1/2014 | Goedeken | | |
| 2019/0197420 A1* | 6/2019 | Singh | ........................ | G06N 3/04 |
| 2022/0086506 A1* | 3/2022 | Wang | ..................... | G06N 3/082 |

OTHER PUBLICATIONS

Minezawa et al. "Proposed high-level syntax specification for ISO/IE C 1 5938-1 7", 128. MPEG Meeting (Motion Picture Expert Group or 1S0/IEC JTC1/SC29/WG11), Oct. 7, 2019-Oct. 11, 2019, Geneva. (Year: 2019).*

Aiyoub Farzaneh, Hossein Kheiri and Mehdi Abbaspour Shahmersi, "An Efficient Storage Format for Large Sparse Matrices", Commun. Fac. Sci. Univ. Ank. Series A1, vol. 58, No. 2, pp. 1-10, 2009. (Year: 2009).*

Coding of Moving Pictures and Audio; ISO/IEC JTC1/SC29/WG11/N18784, "Working Draft 2 of Compression of neural networks for multimedia content description and analysis"; Video Subgroup; Oct. 2019, Geneva, CH, 26 pages.

Coding of Moving Pictures and Audio; ISO/IEC JTC1/SC29/WG11 MPEG2019/m50648, "Proposed high-level syntax specification for ISO/IEC 15938-17"; Mitsubishi Electric Corporation; Oct. 7-11, Geneva, CH, 9 pages.

Wiedeman et al., "Compact and computationally efficient representation of deep neural networks" IEEE transactions on neural networks and learning systems, 2019, 17 pages.

Han et al., "EIE: efficient inference engine on compressed deep neural network" ACM/IEEE 43rd Annual International Symposium on Computer Architecture (ISCA), 2016, p. 243-254., 12 pages.

Wang et al., "Deep Neural Network Approximation for Custom Hardware: Where We've Been, Where We're Going" ACM Computing Surveys (CSUR), vol. 52, No. 2, p. 40, 2019, 37 pages.

Wiedeman et al. "DeepCABAC: Context-adaptive binary arithmetic coding for deep neural network compression" arXiv preprint arXiv: 1905.08318, 2019, 5 pages.

Anonymous, "High Efficiency Video Coding", International Telecommunications Union (ITU), Series H: Audiovisual and Multimedia Systems Infrastructure of audiovisual services—Coding of moving video, International Telecommunications Union Standardization Sector, Recommendation ITU-T H.265, Oct. 2014, 540 pages.

Anonymous, "Audiovisual and Multimedia Systems Infrastructure of audiovisual services—Coding of moving video,—Information Technology—Generic coding of moving pictures and associated audio information: Video: Frame packing arrangement signalling for 3D content", International Telecommunications Union Standardization Sector, Recommendation ITU-T H.262, Amendment 4, Feb. 2012, 238 pages.

Anonymous, "Audiovisual and Multimedia Systems Infrastructure of audiovisual services—Transmission multiplexing and synchronization—Information Technology—Generic coding of moving pictures and associated audio information: Systems", International Telecommunication Union, Telecommunication Standardization Sector of ITU, Recommendation ITU-T H.222, Aug. 2018, 306 pages.

* cited by examiner

411 Bitstream payload coding for a tensor of weights

Decoded (quantized) weight in sparse format

Bitstream payload coding for a tensor of weights

601

Decode *sigFlag*

602 update binary mask

603

Decode *signFlag*

604

Decode remaining bins

605

Is last coefficient decoded?

yes

Decoded (quantized) weight
Binary mask

H    PAYLOAD

SYSTEM AND METHOD FOR COMPRESSION OF DATA STREAM

CROSS-REFERENCE TO RELATED APPLICATIONS

This application is the 371 National Stage of International Application No. PCT/US2020/065974, filed Dec. 18, 2020, which claims priority to U.S. Provisional Application No. 62/951,103, filed Dec. 20, 2019, the disclosures of which are incorporated herein by reference in their entireties.

INTRODUCTION

The domain technical field of the one or more embodiments of the present disclosure is related to the technical domain of data processing, like for data compression and/or decompression. For instance, at least some embodiments relate to data compression/decompression involving large volume of data, like compression and/or decompression of at least a part of an audio and/or video stream, or like compression and/or decompression of data in link with Deep Learning techniques, like at least some parameters of a pre-trained Deep Neural Network.

At least some embodiments relate to improving compression efficiency compared to existing video compression systems such as HEVC (HEVC refers to High Efficiency Video Coding, also known as H.265 and MPEG-H Part 2 described in "ITU-T H.265 Telecommunication standardization sector of ITU (10/2014), series H: audiovisual and multimedia systems, infrastructure of audiovisual services—coding of moving video, High efficiency video coding, Recommendation ITU-T H.265"), or compared to under development video compression systems such VVC (Versatile Video Coding, a new standard being developed by JVET, the Joint Video Experts Team).

To achieve high compression efficiency, image and video coding schemes usually employ prediction, including spatial and/or motion vector prediction, and transforms to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction. Mapping and inverse mapping processes can be used in an encoder and decoder to achieve improved coding performance. Indeed, for better coding efficiency, signal mapping may be used. Mapping aims at better exploiting the samples codewords values distribution of the video pictures.

DESCRIPTION

According to a first aspect, the present principles enable at least one of disadvantages of some known compression and/or decompression methods to be resolved by proposing a method for compressing data, for instance video data or one or more weights of at least one layer of at least one Deep Neural Network.

According to an embodiment, the compression can comprise encoding at least one information representative of a use, during said compression, of a compressed sparse format of the data.

According to a second aspect, the present disclosure proposes a method for decompressing a bitstream, for instance a bitstream representative of a video stream or representative of one or more weights of at least one layer of at least one Deep Neural Network. The decompression can comprise obtaining information representative of at least one zero or non-zero value in at least a part of said input data, and using only the non-zero values of said at least one zero or non-zero value for a further processing of said part of said input data, based on said representative information.

According to some embodiments of the present disclosure, said input data comprises data representative of at least one weight of at least one layer of at least one Deep Neural Network.

According to some embodiments of the present disclosure, said at least one zero or non-zero value is at least one zero or non-zero coefficient of a compressed sparse format of said at least one weight of at least one layer of at least one Deep Neural Network.

According to some embodiments of the present disclosure, said method comprises building a sparse tensor of compressed sparse format by taking account of said representative information obtained for said at least one weight of said at least one layer.

According to some embodiments of the present disclosure, said input data include video data.

According to some embodiments of the present disclosure, said obtaining of information representative of at least one zero or non-zero value in said at least a part of said input data is performed upon decoding at least one information representative of a use of a compressed sparse format on said at least a part of the input data.

According to some embodiments of the present disclosure, said further processing comprises an inference.

According to some embodiments of the present disclosure, said further processing is performed without fully reconstructing said input data.

According to another aspect, there is provided an apparatus. The apparatus comprises a processor. The processor can be configured to compress and/or decompress a video stream and/or one or more weights of at least one layer of at least one Deep Neural Network by executing any of the aforementioned methods.

According to another general aspect of at least one embodiment, there is provided a device comprising an apparatus according to any of the decoding embodiments; and at least one of (i) an antenna configured to receive a signal, the signal including the input data, (ii) a band limiter configured to limit the received signal to a band of frequencies that includes the input data, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising a video data and/or data representative of one or more weights of at least one layer of at least one Deep Neural Network, generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

Figure 1:
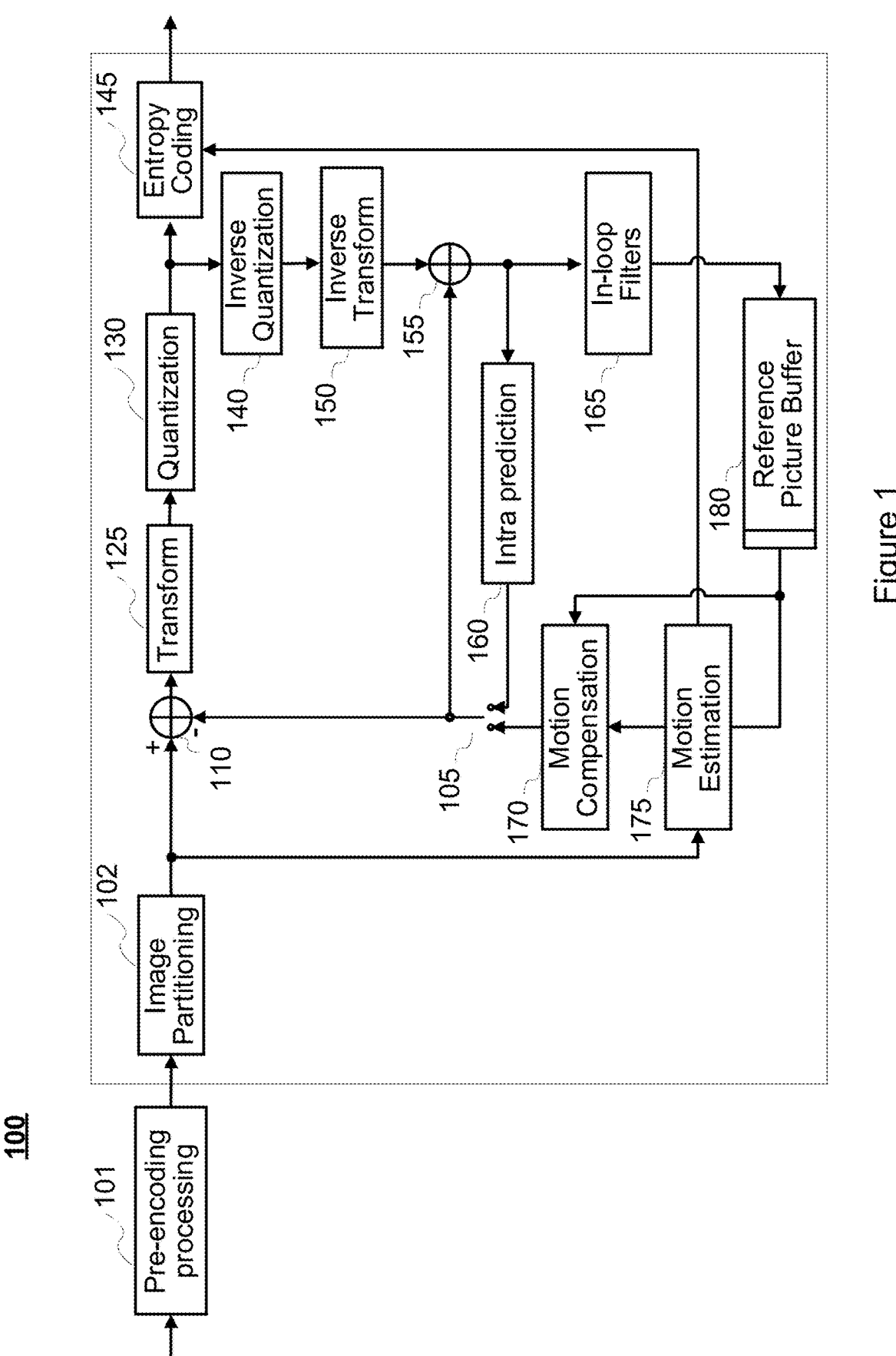
FIG. 1 shows a generic, standard encoding scheme.

It is to be noted that the drawings illustrate example embodiments and that the embodiments of the present disclosure are not limited to the illustrated embodiments.

DETAILED DESCRIPTION

Many technical fields can involve the processing, with computer means, of large volume of data. Such processing can involve data compression and/or decompression of data, for a purpose a storage or of transmission of at least a part of such data for instance. Examples of compression and/or decompression of streams containing large amount of data can be found in the technical field of audio and/or video processing, or in technical fields involving Deep Learning techniques.

For instance, Deep Neural Networks (DNNs) have shown state of the art performance in variety of domains such as computer vision, speech recognition, natural language processing, etc. This performance has however the drawbacks of involving massive computational cost as DNNs tend to have a huge number of parameters often running into millions, and sometimes even billions.

This can lead for instance to prohibitively high inference complexity.

In simple words, inference is the deployment of a DNN, once trained, for processing input data, in view of their classification for instance. Inference complexity can be defined as the computational cost of applying trained DNN to input data for inference.

This high inference complexity can thus be an important challenge for using DNNs in environments involving electronic devices with limited hardware and/or software resource, for instance mobile or embedded devices with resource limitations like energy consumption, size limitation like a battery size, limited computational power, and memory capacity etc.

At least some embodiments of the present disclosure can apply to compression and/or decompression of at least one pre-trained DNN, to facilitate the transmission and/or storage of the at least one pre-trained DNN and/or to help lowering inference complexity. It is however to be understood that the embodiments detailed hereinafter have only an exemplary purpose and that at least some other embodiments of the present disclosure can relate to compression/decompression of data in other technical domains than Deep Neural Networks.

DNNs require a lot of computations and energy at inference, particularly for edge computing. Fast and low complexity implementations have been designed for the inference of sparse DNNs, i.e. DNNs including layers associated with matrices, or more generally tensors, containing a lot of zero coefficients. Coefficients of matrices or of tensors of a DNN are also called herein weights or parameters. Furthermore, in the following, for simplicity purpose, the term matrix can sometimes be used to denote the set of weights of a given layer. It is to be understood, however, that some embodiments of the methods of the present disclosure can also be applied to tensors of weights with more than two dimensions, such as 2D convolutional layers which usually contain 4D tensors of weights.

Compressed sparse formats aim to represent tensors in a compressed manner. Instead of storing a whole tensor, a large number of zero weights can be indicated in the manner of variable length coding.

An example of compressed format for sparse matrices is presented below.

For instance, the values of non-zero weights of a tensor and the number of zero weights preceding them can be stored in two equal-length vectors for each column.

In a first example, the following column (or row) of a weight matrix:

[0, 0, 1, 0, 0, 0, 0, 0, 0, 2, 0, 0, 0, 0, 0, 0, 0, 0, 0, 0, 0, 3]

can be stored as two vectors v, z, with v=[1, 2, 3] and z=[2, 6, 12], where vector z gives the number of consecutive zeros preceding non-zero coefficients and v gives the actual values of non-zero coefficients.

As a second example using same notations, the following column (or row) of a weight matrix:

[0, 0, 1, 2, 0, 0, 0, 0, 0, 0, 0, 0, 0, 0, 0, 0, 0, 0, 0, 0, 0, 3]

can be stored as v=[1, 2, 0, 3] and z=[2, 0, 15, 2]. As Vector z is coded on 4 bits, in this example, the maximum value of a number of non-zero coefficient is 15. Thus, the value "0" in vector v is added in this second example since there are more than 15 consecutive zeros in the example row. Here, there are 18 consecutive zeros in the original vector, hence 15 appears in z, then the value 0 in v for the $16^{th}$ zero and 2 in z for the remaining 2 zeros before the last value 3.

A compressed format for sparse matrices will be called "compressed sparse row format", or more simply "compressed sparse format", in the following.

Compressing and transmitting sparse layers using compressed sparse formats would either (first case) require computing the compressed sparse format at the encoder and then encode it, or (second case) encode the original matrix and compute the compressed sparse format after decoding. In the first case, the method used to encode the DNN has to be adapted to the new type of content to encode, which can constrain the choice of compressed sparse format, as well as the efficiency of the compression method. In the second case, the original sparse matrices are encoded and decoded. Then, a pre-processing step (in view of a further processing, like an inference in the exemplary case of a DNN) is added for computing the compressed sparse format to reduce the inference complexity in terms of number of multiplications and memory. However, this step still represents a burden at the edge device since it needs to parse again the original matrix, once decoded, which thus implies loading the matrix or at least parts of the matrix in memory and check for zeros in. These checks can imply an additional, sometimes heavy, computation cost (in terms of use of processing resources and/or of delay).

For instance, Graphical Processing Units (GPUs) often use a SIMT (Single Instruction, Multiple Threads) execution model. By SIM execution model, it is to be understood a model where a same sequence of operations is computed in parallel on different data. The processing speed can thus be directly linked to the slowest thread, which might be affected by the checking for zeros. Furthermore, using threads with variable runtimes can require the use of synchronization barriers which may have an impact on computing performances. Thus, sparsifying tensors (for instance tensors of weights of DNNs) does sometimes not directly lead to fast inference. However, contrary to GPUs, custom hardware can take great advantage of compressed sparse formats, using, for instance, content addressable memory (CAM) and/or Logic-in-Memory Hardware.

At the corresponding decompression stage of all the above exemplary compression techniques, a module has to check the zeros and compute another representation of the tensors.

The present disclosure proposes, in at least some embodiments, a decoder implementation where a compressed sparse format can be directly computed at the time of the entropy decoding of the bitstream. Depending upon embodiments, the computing can be performed prior to reconstructing, and/or by reconstructing only partially (i.e. without fully reconstructing), at least some of the data represented, once encoded, by the bitstream. For instance, at least one weight of an original weight matrix (that has been encoded) can be not reconstructed. Indeed, such an embodiment can permit to bypass the checks for zeros, which would otherwise take place as a separate post-decoding step, or at a pre-processing step at the inference, and thus can help to reduce the memory required at decoding and/or at inference.

For instance, at least some embodiments of the present disclosure, adapted to the technical field of DNNs, use the assertion that a DNN containing layers with sparse tensors of weights is used after being compressed using a Neural Network Compression codec. Such embodiments can help providing faster implementations for inference after decoding.

The Neural Network Compression codec can be, for instance, a Neural Network Compression codec according to a compression standard for neural networks, like the Neural Network Compression codec described in incoming ISO/MPEG7 compression standard of neural networks for multimedia content description and analysis.

At least some embodiments of the present disclosure can apply, for instance, in the context of some standard for compressing pre-trained DNNs which contain layers encoded/compressed using the Context-Adaptive Binary Arithmetic Coding (CABAC), as recently adopted in the working draft of MPEG-7 part 17 for the Compression of neural networks for multimedia content description and analysis.

Indeed, CABAC requires to split weight values into bins to be encoded separately. When coding sparse tensors, this binarization actually extracts the info of zero/non-zero coefficient, which corresponds, in the exemplary embodiment illustrated, to the least significant bin. At least some embodiments of the present disclosure propose to use the Context-Adaptive Binary Adaptive Coding (CABAC) technology to directly extract compressed representations at the decoding stage for determining non-zero coefficients of the sparse matrix, reconstructing the weight matrix corresponding to the sparse matrix.

The CABAC arithmetic coding engine takes bins as input, i.e. binary values (being either 0 or 1), instead of integer or float values. In the case were the information to be encoded is not a binary flag, a binarization operation can be performed to transform the input values into bins. Each bin (or bit) is then encoded separately.

DeepCABAC, that can be used in some compression standards like the MPEG NN compression standard, uses the same arithmetic coding engine as CABAC (used for instance for coding residuals in MPEG video codecs) and a slightly different binarization process. This binarization corresponds to a combination of truncated unary code and fixed length remaining absolute value symbol.

The binarization process $400$ of DeepCABAC is illustrated in FIG. $4$, as an example, for numbers $402$ ranging from ($-8$) to 8.

The binarization process is based on a set $410$ of symbols (or flags), as the illustrated flags sigFlag $411$, SignFlag $412$, AbsGr1Flag $413$, AbsGr2Flag $414$, AbsGr4Flag $415$, RemAbs $416$, AbsGr8Flag $417$ and the bypass bins $418$ and $419$.

The processing of a weight value results in a list (or sequence) $420$ of bins corresponding to respective values ($421$ to $429$) of at least some of the symbols ($411$ to $419$).

The exemplary encoding of the number 7 is described hereinafter with more details.

The encoding of the number 7 is shown in FIG. $4$ by an highlighted column (element $420$). As shown by FIG. $4$, the column $420$ encoding number 7 corresponds to a list of bins (or bits) following the number 7 at the top and descending its column) computed as follow:

Abs(7) is greater than 0, then the significance flag sigFlag $411$ has the value "1" (element $421$ of FIG. $4$)

7 is positive, then the sign flag SignFlag $412$ has the value "0" (element $422$ of FIG. $4$)

7 is greater than 4, then "greater than 1" flag AbsGr1Flag has the value "1" (element $423$ of FIG. $4$), "greater than 2" flag AbsGr2Flag $414$ has the value "1" (element $424$ of FIG. $4$), and "greater than 4" flag AbsGr4Flag $415$ has the value "1" (element $425$ of FIG. $4$)

7 is less than 8, then "greater than 8" flag AbsGr8Flag $417$ has the value "0" (element $427$ of FIG. $4$)

According to the exemplary use case of FIG. $4$, 2 bypass bins $418$, $419$ are then coded with values "1" and "0" respectively (elements $428$, $429$ of FIG. $4$).

(In the example of number 7, no value is assigned to some RemAbs flag $416$)

Finally, the sequence to encode for the number "7" is "10111010". The sequence of bins is then arithmetically encoded using the CABAC engine. Regular bins are contextually coded, using previously encoded weights, and bypass bins are classically coded using arithmetic coding. In both cases, adaptive coding is applied, i.e. at both encoder and decoder sides, an initial probability is assigned to each flag before the encoding or decoding of the first of the flags for the first weight and each probability is updated after encoding or decoding of at least one of the flags. For instance, in case each flag is expected to be equiprobable (i.e. 50% chance to be 0 or 1), this initial probability can be assigned to each flag before encoding the first of the flags. The probability model can thus be updated each time the value for the corresponding flag of the next weight is encoded. Of course, other initial probabilities can be assigned to the flags.

Probability models can be reinitialized for each layer of a DNN or kept from a current layer to the next layer. In video, probability models can be reinitialized at each frame or slice. Embodiments where the probability model is reinitialized at each layer (in case of DNN), or frame/slice for video, can be adapted to embodiments where several layers, respectively several frames and/or slices for video, can be decoded in parallel. Furthermore, the reinitialization of a probability model can help avoiding error propagation.

In the following, the term CABAC is used to denote the systems including a binarization followed by the adaptive binary arithmetic coding, which DeepCABAC belongs to.

In order to further take advantage of spatial correlations between neighboring weights, context can be assigned to the regular bins, whereas the remaining bins are coded using the low-complexity bypass coder. Thus, each bin is arithmetically coded based on the value of the neighboring weight's corresponding bin which has been coded just before. Two different probability models are selected depending on whether the current and the previous flag have the same value.

According to at least some embodiments of the present disclosure, it is proposed to take account of at least one flag of the encoded stream, being representative of a "zero" or "non-zero" value of coefficients in the encoded stream. In the exemplary use case of CABAC, such a flag can be the significance flag "SigFlag" for instance. Indeed, in at least some exemplary embodiments based on CABAC, the binarization actually extracts the info of zero/non-zero coefficient in the first flag it encodes/decodes, i.e. the significance flag sigFlag.

At least some embodiments of the present disclosure propose to use such a flag to derive a decoder implementation where compressed sparse format can be directly computed from the entropy decoded bitstream without reconstructing the weight matrix corresponding to the compresses sparse format. Indeed, such an embodiment can enable to bypass, at least partially, the checks for zeros performed on the decoded part of the bitstream and can thus help to reduce the memory required at decoding/inference stage. Indeed, there is no need to fully reconstruct the matrices of weights or even parts of them to locate the zeros. Thus, compressed sparse formats can be computed on the fly, given the value of the decoded sigFlag.

Such embodiments can thus permit to obtain sparse matrices while avoiding to first load in memory the entire decoded matrix. In the exemplary use case of DNN, the matrix associated with one layer can represent millions of parameters. Thus, such embodiments can permit significative gain in terms of complexity and/or processing delay, which can be of importance notably in case of edge processing, when the pre-trained DNN is to be used in a mobile terminal, like a smartphone for instance.

Figure 5:
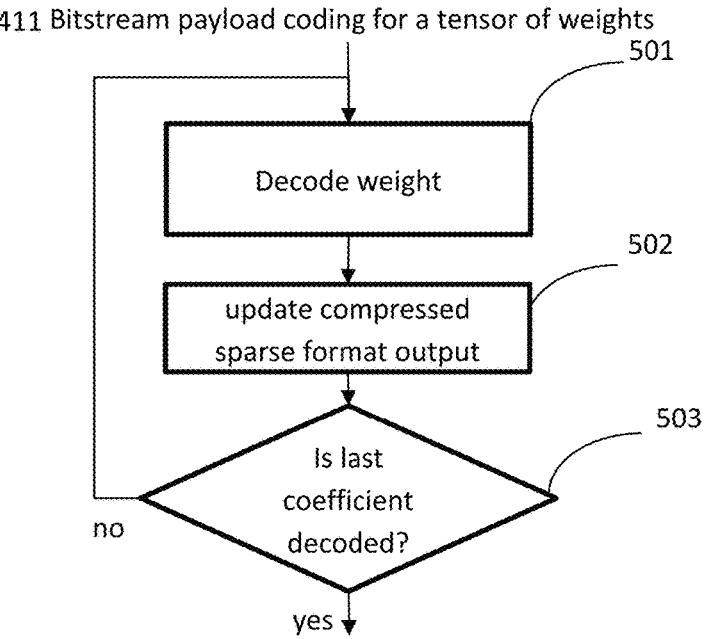
FIG. 5 shows an exemplary in-loop building of a compressed sparse format output tensor according to at least some embodiments of the present disclosure.

FIG. 5 shows an exemplary embodiment of the computation of the compressed sparse formats, where the decoding (501) and the updating of the output tensors or vectors (502), can be performed together weight by weight (503). Hence, as explained above, by taking account of a flag representative of the "zero" or "non-zero" value of coefficients in an encoded stream, like the flag "SigFlag" as in the exemplary use case detailed herein, there is no need to decode and load the full tensor in memory (in other words to reconstruct the full tensor in memory) to compute the compressed sparse format.

In a variant, adapted for instance to an implementation of a decoder that shall be compatible with a plurality of compressed sparse formats (like compressed sparse formats known as Compressed Sparse Row (CSR) or Compressed Row Storage (CRS) or Yale format), a binary mask indicating the zero coefficients can be built at the entropy decoding depending on flags "Sigflag" (or other representative flags).

Figure 6:
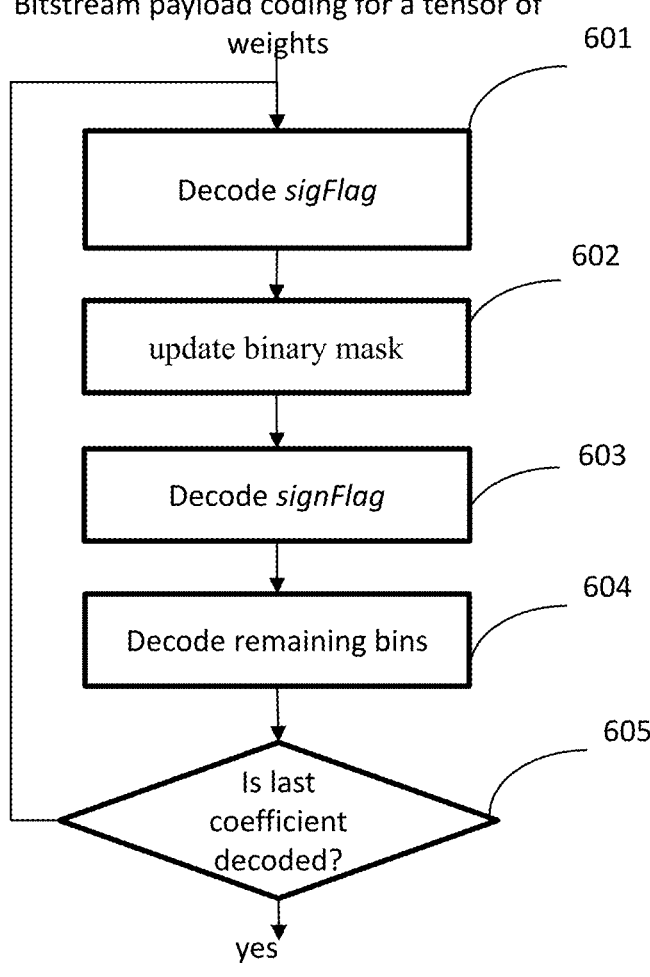
FIG. 6 shows an exemplary flow chart of an in-loop extraction of a binary mask according to at least some embodiments of the present disclosure.

FIG. 6 shows how the binary mask can be extracted and updated (602) after decoding each representative flag (601), as the SigFlag, according to an exemplary embodiment. The remaining bins (other than the flag SigFlag in the embodiments of FIG. 6) for decoding each weight are then decoded (603,604) until the last weight (or in other words the last coefficient) is decoded (605).

By using one or more flag(s) (like the sigFlag) introduced by one or more standard compression methods (like CABAC), instead of requesting the encoding of a dedicated information, at least some embodiments of the present disclosure can help to obtain a generic decoder, that can be adapted to decode a bitstream encoded by a legacy encoder while helping to accelerate the check for zeros in a later sparse matrix format construction.

According to some other embodiments, the way the decoding is performed can vary based at least partially on at least one syntax element (like one or more flag(s) or index values, and/or a combination thereof) present in the encoded bit stream.

Notably, different decoder implementations, which can output matrices (or more generally tensors) in a different format or additional information, can be triggered depending on a syntax element (or flag) in the encoded bitstream Such an embodiment can help providing a possibility to activate the tool only if weight pruning (or in other words matrix sparsification) is applied, which results in a sparse tensor, or only if a tensor is found to be sparse before encoding.

The syntax element can for instance signal a use, or an absence of use, of a compressed sparse format or a weight pruning method at the encoding stage. Multiple options can be considered for the type of syntax. For instance, in some embodiments, one flag can be provided per tensor of weights or layer. This flag can be potentially included in a Layer Parameter Set, which contains the syntax required to decode the attached weights. For instance, a flag like a "layer_sparse_tensor" flag can be included in a Layer Parameter Set and coded as one bit.

In some embodiments of the present disclosure, the syntax element can comprise at least one index which indicates for instance which compressed sparse format to construct at the decoder, among several possible compressed sparse formats. The number of bits to code for this index would depend on the number of considered sparse formats. This would allow an encoder to optimize the sparsification according to a given compressed sparse format and ensure the proper reconstruction at the decoder. According to some embodiments of the present disclosure, in case the generation of the compressed sparse format is done after decoding, this syntax can be including in a so-called Side Enhancement Information (SEI) message, used for instance in compression standards, for providing additional optional information on the content, without modifying the decoding process.

In some embodiments, one flag (like a single flag) can be provided for the entire network. This flag can be contained in a Network Parameter Set, which contains the high-level syntax describing the tools and the different layers of the DNN, for instance. In such embodiments, the compressed sparse format generation can be activated for the whole DNN (or in other words for all layers of the DNN). In some embodiments, this flag can be included in the Layer Parameter Sets, which contain the information relative to each layer. In such embodiments, the compressed sparse format generation can be activated per layer.

Figure 7:
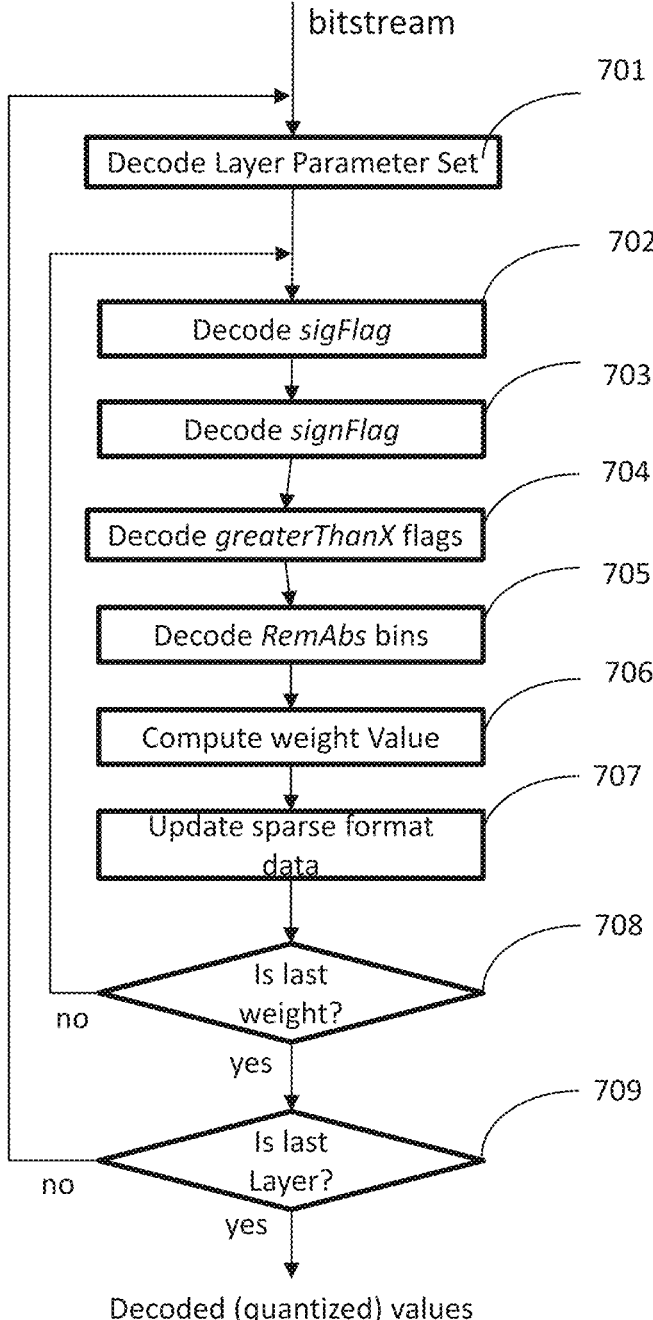
FIG. 7 shows an exemplary flow chart of a decoder, according to an exemplary embodiment of the present disclosure, where the decoder is based on a CABAC binarization and where the compressed sparse format data is directly computed at the decoding stage.

At the decoding side, as illustrated by FIG. 7, at least some embodiments of the method of the present disclosure can comprise obtaining the parameters necessary for decoding a layer of the DNN by decoding (701) the Layer Parameters Set. According to at least one embodiment, the Layer Parameter Set contains a syntax to activate the generation of the compressed sparse format version of the decoded data. As explained above, this syntax is optional and can be omitted in some embodiments. In the exemplary use case of CABAC, for instance, the method can include, obtaining a syntax element representative of a presence of a compressed sparse format (optional) and, for a weight, decoding 702 the flag "SigFlag", decoding 703 the sign flag, decoding 704 the "greaterthanX (with X: 1, 2,4, and/or 8 for instance), decoding 705 the RemAbs bins. Depending upon embodiments, the decoding (702,703,704,705) of the flags can be performed sequentially and/or (at least for some flags) in parallel. Then, the actual weight values can be computed from the different flags (706). In the illustrated embodiment of FIG. 7, for example upon determining that a compressed sparse format is used, via a syntax in the Layer Parameter Set, for instance a flag like a "layer_sparse_tensor" flag, the Sparse Format data can be updated depending on a representative flag (like the significance flag SigFlag) for distinguishing zero and non-zero weights and the value of the weight (707). For instance, as in the illustrated embodiments of FIG. 7, the decoding (702,703,704,705, 706) of the weight and the update 707 of the compressed sparse format output data can be performed sequentially, one weight after the other (708). In some embodiments of the present disclosure, the significance flags can be encoded together with the remaining bins of each weight, following the order of binarization.

In some embodiments of the present disclosure, a significance map, gathering the significance flags, can be generated at the encoding side and encoded. In other terms, the significance flags can be encoded separately from the other bins representing the weight values in the bitstream. Such an embodiment can permit an easier extraction at the decoding side. The obtaining of a significant map is hereinafter described in more details, in link with FIG. 8.

Figure 8:
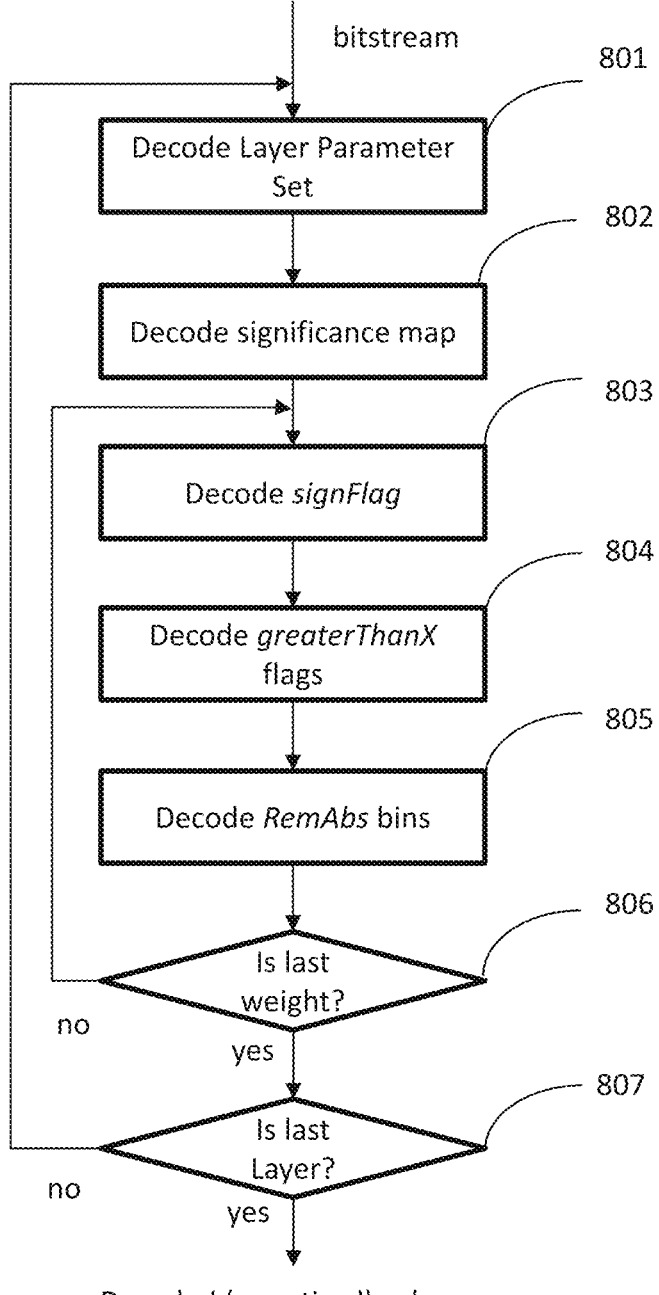
FIG. 8 shows an exemplary flow chart of a decoder based on a CABAC binarization, with exemplary embodiments of the present disclosure, where a significance map is decoded separately from the other bins coding the weights of tensors.

As illustrated by FIG. 8, at least some embodiments of the decoding method of the present disclosure can comprise obtaining the parameters set (801) necessary for decoding a layer of the DNN by decoding (801) the Layer Parameters Set and decoding 802 the significance map associated with a layer. The method can also comprise decoding bins, other that the flag sigFlag, for the weights of the layer. For instance, in the exemplary use case of CABAC, as illustrated by FIG. 8, the method can include, after having decoded the significance map for the tensor, for each weight, decoding 803 the sign flag, decoding 804 the "greaterthanX (with X: 1, 2,4, and/or 8 for instance), decoding 805 the RemAbs bins. Depending upon embodiments, the decoding (803,804, 805) of the flags, other than the flags "SigFlag", can be performed sequentially, for instance per each weight of the layer and/or (at least for some flags) in parallel. As a resume, after decoding the Parameter Set of syntax element required for decoding the tensor of coefficients for the layer (801), the significance map can be decoded (802) before the remaining information (803,804,805).

The above processing can be iterated (807, 808) on several weights of several layers. The loop over the weights (806) can thus be separated from the entropy decoding of significance flags.

When comparing embodiments of FIG. 7 and FIG. 8, It is to be pointed out that a use of a significance map has no negative impact on the compression efficiency since the bins derived from each weight are encoded separately anyway.

The present disclosure has been presented in link with exemplary embodiments using the CABAC technology. Of course, some embodiments of the present disclosure can also be based on other binary technology, comprising at least one syntax element representative of at least one zero" and/or non-zero value.

Figures 9, 10:
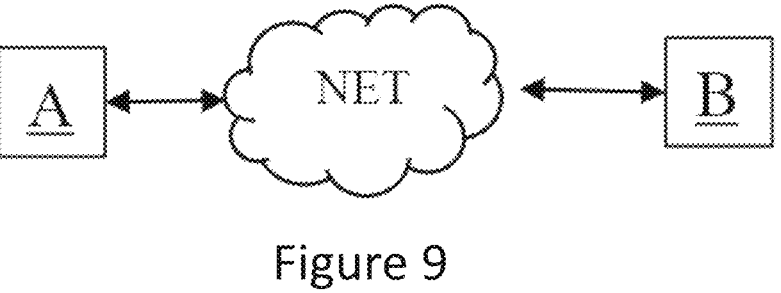
FIG. 9 shows two remote devices communicating over a communication network in accordance with an example of present principles.
FIG. 10 shows the syntax of a signal in accordance with an example of present principles.

According to an example of the present principles, illustrated in FIG. 9, in a transmission context between two remote devices A and B over a communication network NET, the device A comprises a processor in relation with memory RAM and ROM which are configured to implement a method for compressing data, for instance data representative of a Deep Neural Network, as described in relation with the FIG. 1-8 and the device B comprises a processor in relation with memory RAM and ROM which are configured to implement a method for decompressing the data as described in relation with FIG. 1-8.

In accordance with an example, the network is a broadcast network, adapted to broadcast/transmit the compressed data from device A to decoding devices including the device B.

A signal, intended to be transmitted by the device A, carries at least one bitstream comprising compressed data. According to an embodiment, the compressed data is representative of weights of one or more layers of a Deep Neural Network.

FIG. 10 shows an example of the syntax of such a signal transmitted over a packet-based transmission protocol. Each transmitted packet P comprises a header H and a payload PAYLOAD. According to embodiments, the payload PAYLOAD may comprise at least one information representative of a use of a compressed sparse format on said at least a part of the data encoded in the bitstream.

According to another embodiment, the data may be organized in the payload in such a way that significance flags are gathered and encoded separately from the remaining information of the data.

ADDITIONAL EMBODIMENTS AND INFORMATION

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 2:
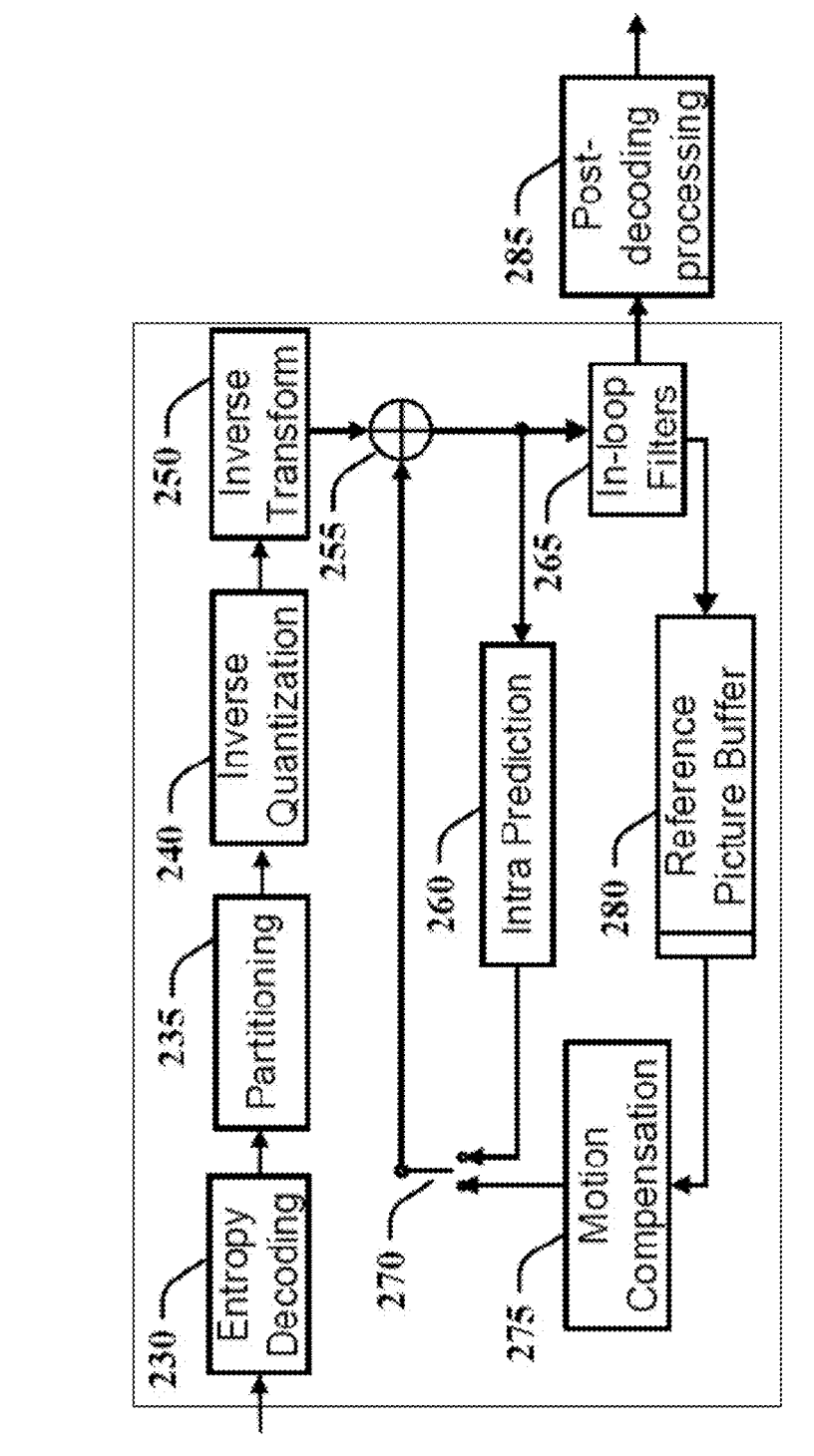
FIG. 2 shows a generic, standard decoding scheme.
Figure 3:
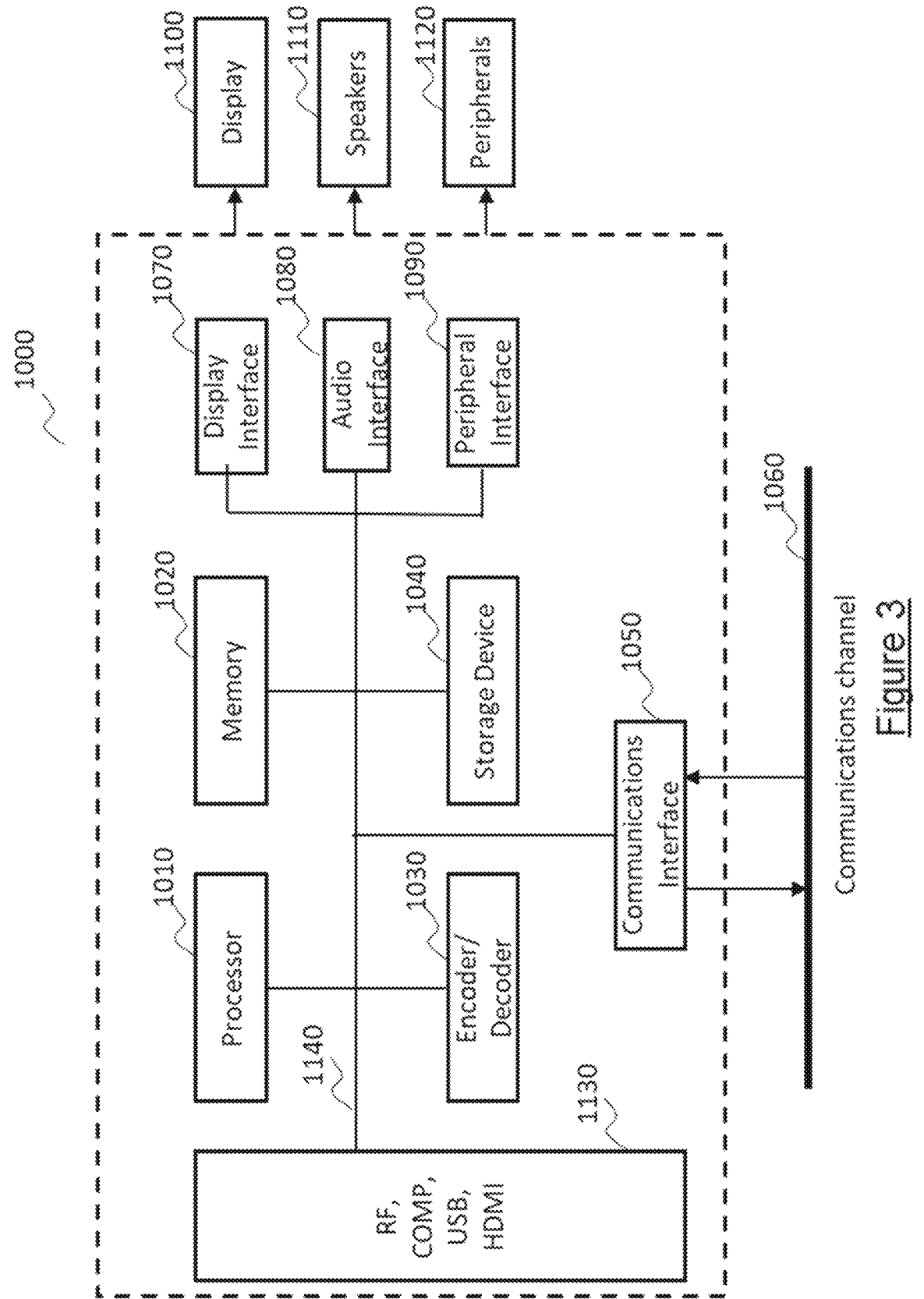
FIG. 3 shows a typical processor arrangement in which the described embodiments may be implemented
Figure 4:
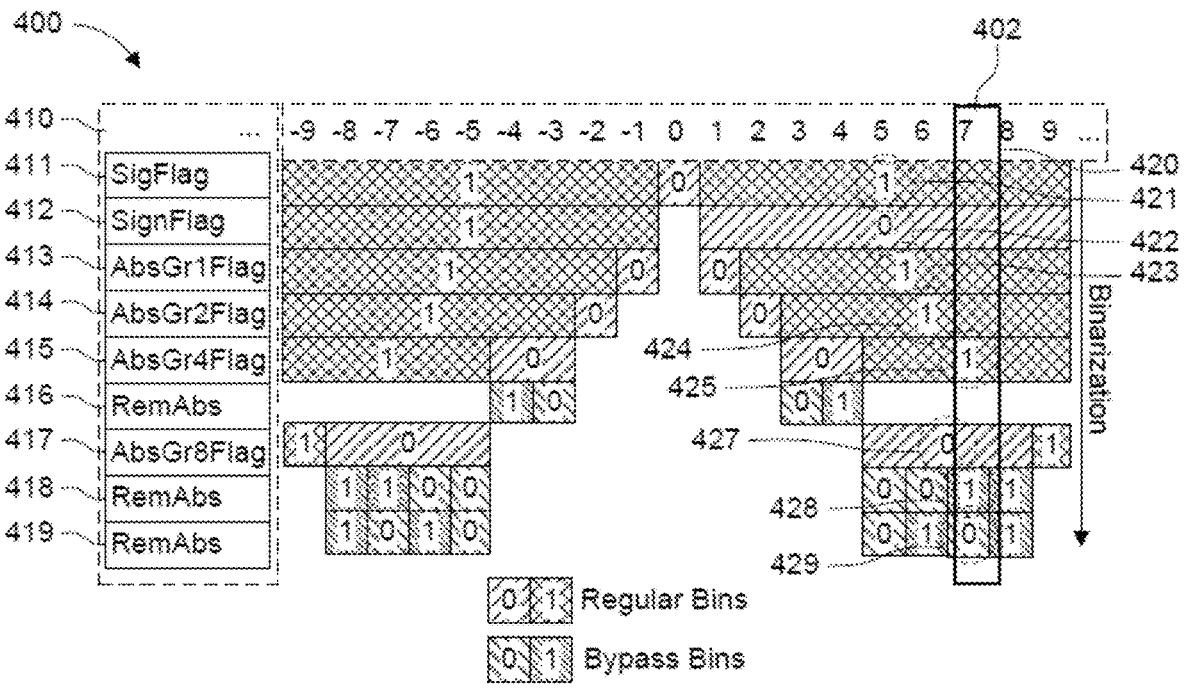
FIG. 4 shows an exemplary binarization module of Deep-CABAC, that can be used under the general aspects described.

The aspects described and contemplated in this application can be implemented in many different forms. FIGS. 1, 2 and 3 below provide some embodiments, but other embodiments are contemplated and the discussion of FIGS. 1, 2 and 3 does not limit the breadth of the implementations.

At least one of the aspects generally relates to encoding and decoding (for instance, video encoding and decoding, and/or encoding and decoding of at least some weights of at least some layer of a DNN), and at least one other aspect generally relates to transmitting a bitstream generated or encoded. These and other aspects can be implemented as a method, an apparatus, a computer readable storage medium having stored thereon instructions for encoding or decoding data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of an encoder 100 and decoder 200 as shown in FIG. 1 and FIG. 2. Moreover, the present aspects are not limited to WC or HEVC, and can be applied, for example, to other standards and recommendations, whether pre-existing or future-developed, and extensions of any such standards and recommendations (including WC and HEVC).

Moreover, the present aspects are not limited to WC or HEVC, or even to video data, and can be applied to an encoder or decoder adapted to encode, respectively decode, at least one layer of a neural network that can be used in many technical fields other than video (of course, in such embodiments, some modules like intra prediction module 160 can be optional)

Unless indicated otherwise, or technically precluded, the aspects described in this application can be used individually or in combination.

Various numeric values are used in the present application (for example modes used for reshaping). The specific values are for example purposes and the aspects described are not limited to these specific values.

FIG. 1 illustrates an encoder 100. Variations of this encoder 100 are contemplated, but the encoder 100 is described below for purposes of clarity without describing all expected variations.

Before being encoded, the sequence may go through pre-encoding processing (101), for example, applying a color transform to the input color picture (e.g., conversion from RGB 4:4:4 to YCbCr 4:2:0) in case of a video sequence, or performing a remapping of the input picture components in order to get a signal distribution more resilient to compression (for instance using a histogram equalization of one of the color components). Also, pre-encoding processing can include binarization as the exemplary binarization detailed above in link with CABAC.

Metadata can be associated with the pre-processing and attached to the bitstream.

In the encoder 100, in case of a video sequence, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130).

The quantized transform coefficients, as well as motion vectors and other syntax elements, are entropy coded (145) to output a bitstream. Optionally, the other syntax element can comprise at least one syntax elements signaling a tensor being compressed format sparsed.

The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. For instance, in case of a video sequence, combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of a decoder 200. In the decoder 200, a bitstream is decoded by the decoder elements as described below. Decoder 200 generally performs a decoding pass almost reciprocal, to the encoding pass as described in FIG. 1. The encoder 100 also generally performs decoding as part of encoding data.

In particular, the input of the decoder 200 includes a bitstream, which can be generated by encoder 100. The bitstream is first entropy decoded (230) to obtain transform coefficients, motion vectors, and other coded information.

In case of a video bitstream, the picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded element (like the picture or the layer weights) can further go through post-decoding processing (285), for example, in case of a decoded image, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 3 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded or decoded data stream (such a video stream and/or a stream representative of at least one weight of at least one layer of at least one DNN), and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, data representative of at least one weight of at least one layer of the at least one DNN, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or WC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 3, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which can be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the data stream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or another device. The display 1100 can also be integrated with other components (for example, as in a smart phone), or separate (for example, an external monitor fora laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV. Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals at least one of a plurality of transforms, coding modes or flags. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

A process or device to perform encoding and decoding with deep neural network compression of a pre-trained deep neural network.

A process or device to perform encoding and decoding with inserted information in a bitstream representative of parameters to implement deep neural network compression of a pre-trained deep neural network comprising one or more layers.

A process or device to perform encoding and decoding with inserted information in a bitstream representative of parameters to implement deep neural network compression of a pre-trained deep neural network until a compression criterion is reached.

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine coding mode in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

What is claimed is:

1. A method for decoding a bitstream comprising, coded data representative of a weight matrix of at least one Deep Neural Network (DNN), wherein a not compressed sparse representation of the weight matrix is coded with Context-Adaptive Binary Adaptive Coding (CABAC), the method comprising:

decoding a respective significance flag (SigFlag) for a plurality of coefficients of the weight matrix in the not compressed sparse representation, wherein the respective SigFlags for each of the plurality of coefficients of the weight matrix are included in a significance map, wherein each respective SigFlags is decoded by parsing the significance map, and wherein the significance map is decoded separately from one or more bins representing weight values in the bitstream;

determining whether the respective SigFlag for each of the plurality of coefficients is a zero value or a non-zero value; and storing a compressed sparse representation of the weight matrix by determining a first part of the compressed sparse representation of the weight matrix based on the respective SigFlags for each of the plurality of coefficients, wherein the first part of the compressed sparse representation comprises numbers of consecutive zero-coefficients preceding a non-zero coefficient.

2. The method of claim 1, wherein the compressed sparse representation of the weight matrix is determined without using coefficients of the plurality of coefficients that have been determined to have a SigFlag with a zero value.

3. The method of claim 1, wherein the compressed sparse representation of the weight matrix is determined without loading a full tensor associated with the bitstream.

4. The method of claim 1, wherein determining the compressed sparse representation of the weight matrix comprises building a sparse tensor having a compressed sparse format based on information obtained for weights of the at least one layer of at least one DNN.

5. The method of claim 1, wherein the compressed sparse representation is a Compressed Sparse Row (CSR).

6. The method of claim 1, further comprising receiving the bitstream comprising the coded data.

7. The method of claim 6, wherein the compressed sparse representation is updated as coefficients of the weight matrix of the received bitstream are decoded.

8. The method of claim 1, further comprising decoding a layer parameter set prior to decoding the respective Sig-Flags.

9. The method of claim 1, wherein the first part of the compressed sparse representation is stored in a first vector and a second part of the compressed sparse representation is stored in a second vector, the second part of the compressed sparse representation comprising non-zero coefficients, and wherein the first vector and second vector have equal lengths.

10. A decoding device for decoding a bitstream comprising coded data representative of a weight matrix of at least one Deep Neural Network (DNN), wherein a not compressed sparse representation of the weight matrix is coded with Context-Adaptive Binary Adaptive Coding (CABAC), the decoding device comprising:

a processor configured to:

decode one or more respective significance flag (SigFlag) for a plurality of coefficients of the weight matrix, wherein the respective SigFlags for each of the plurality of coefficients of the weight matrix are included in a significance map, wherein the respective SigFlags is decoded by parsing the significance map, and wherein the significance map is decoded separately from one or more bins representing weight values in the bitstream;

determine whether the respective SigFlag for each of the plurality of coefficients is a zero value or a non-zero value; and store a compressed sparse representation of the weight matrix by determining a first part of the compressed sparse representation of the weight matrix based on the respective SigFlags for each of the plurality of coefficients, wherein the first part of the compressed sparse representation comprises numbers of consecutive zero-coefficients preceding a non-zero coefficient.

11. The decoding device of claim 10, wherein the compressed sparse representation of the weight matrix is determined without using coefficients of the plurality of coefficients that have been determined to have a SigFlag with a zero value.

12. The decoding device of claim 10, wherein the compressed sparse representation of the weight matrix is determined without loading a full tensor associated with the bitstream.

13. The decoding device of claim 10, wherein being configured to determine the compressed sparse representation of the weight matrix comprises being configured to build a sparse tensor having a compressed sparse format based on information obtained for weights of the at least one layer of at least one Deep Neural Network.

14. The decoding device of claim 10, wherein the compressed sparse representation is a Compressed Sparse Row (CSR).

15. The decoding device of claim 10, wherein the processor is further configured to receive the bitstream that comprises the coded data.

16. The decoding device of claim 15, wherein the compressed representation is updated as coefficients of the weight matrix of the received bitstream are decoded.

17. The decoding device of claim 10, wherein the processor is further configured to decode a layer parameter set prior to decoding the respective SigFlags.

18. The decoding device of claim 10, wherein the first part of the compressed sparse representation is stored in a first vector and a second part of the compressed sparse representation is stored in a second vector, the second part of the compressed sparse representation comprising non-zero coefficients, and wherein the first vector and second vector have equal lengths.

* * * * *